Patented Feb. 19, 1935

1,992,053

UNITED STATES PATENT OFFICE 1,992,053

OXIDATION OF ARSENIOUS ACID

Ernest R. Boller, Cleveland Heights, Ohio, assignor to The Grasselli Chemical Company, Cleveland, Ohio, a corporation of Delaware No Drawing. Application October 28, 1933, Serial No. 695,722

5 Claims. (Cl. 23—144)

The present invention relates to the oxidation of arsenious acid to arsenic acid by means of elemental oxygen in the presence of water, a catalyst and under conditions of superatmospheric pressure and at temperatures above 100° C.

There are many ways of oxidizing arsenious acid to arsenic acid. They all involve the use of a suitable oxidizing agent; such as nitric acid, sodium chlorate, sodium peroxide, chlorine, etc. Commercially, arsenic acid is usually produced by oxidation of white arsenic with nitric acid.

Many attempts have been made to oxidize arsenious acid with atmospheric oxygen. It was, for instance, found that in extremely dilute solutions arsenious acid could be oxidized with air in the presence of various heavy metal nitrates; arsenites have also been oxidized to a certain extent with air, but so far as I am aware none of such prior processes of oxidizing by means of air have been successful to replace the common nitric acid oxidation.

I have tried to oxidize saturated aqueous solutions or suspensions of arsenious acid in the absence of a catalyst but even under superatmospheric pressure and at temperatures above 100° C. I found that only insignificant amounts of arsenic acid were formed.

I have, however, found that in the presence of a catalyst the air oxidation of arsenious acid takes places at elevated pressures and temperatures very readily, even if the catalyst has practically no action under atmospheric conditions.

The catalysts which promote the oxidation of arsenious acid under the conditions of my process may be soluble or insoluble in the reacting solution.

Active carbon, such as for instance that known under the trade name "Darco", silicic acid gels and platinized asbestos are of the insoluble type; iodine and iodides, or iodine compounds which form free iodine in the reaction mixture, salts of metals capable of existing in two valency stages, such as copper, vanadium, manganese, iron, chromium, etc. salts, are representatives of the soluble catalysts.

I further found that in many instances a combination of a soluble with an insoluble catalyst produces an effect far superior to the effect of either one alone.

In the performance of my invention I prepare an aqueous solution or suspension of arsenious acid. I charge this into a pressure vessel and heat for instance by introduction of steam. The desired catalyst is added, if not already present in the water, and air introduced into the reaction liquid. The temperature in the vessel is then adjusted to above 100° C. with corresponding pressure and the introduction of air continued until substantial complete oxidation has been obtained. In practice it is advisable to use a large excess of air and to continuously purge the system from the nitrogen and excess oxygen introduced.

The rate of reaction depends to a large extent upon the temperature, pressure and amount of catalyst present. I found that for the more active catalysts a complete oxidation takes place within a reasonable time (for instance 6 hours) at a pressure of 60–70 lbs. per sq. inch and at a temperature of 130–140° C. For less active catalysts higher temperatures and pressures or longer reaction time, or a larger amount of catalyst will be required to complete the oxidation.

The less active catalysts are the soluble metal salts alone, or the insoluble porous compounds alone, and the more active catalysts are the combination of the insoluble with the soluble compounds.

The following gives in tabular form comparative results obtained by blowing air into a pressure vessel containing an aqueous solution or suspension of arsenious acid and the catalyst as specified. For comparative purposes the results from a large number of experiments have been chosen in which some of the conditions were constant, but it is understood that the reaction can be carried out at different concentrations and conditions of temperature, or pressure. Results obtained at atmospheric pressure and temperatures below 100° C. have been included for comparative purposes.

| Type of catalyst | Amount of catalyst percent based on As₂O₃ | Temperature | Pressure | Time | Percent oxidation |
|---|---|---|---|---|---|
| | | °C. | Pounds | Hours | |
| None | None | 80–90 | Atmospheric | 6 | 0.35 |
| Activated carbon | 10 | 80–90 | Atmospheric | 6 | 0.94 |
| KI | 1 | 80–90 | Atmospheric | 6 | None |
| None | None | 130–140 | 60–70 | 6 | 1.6 |
| KI | 0.55 | 130–140 | 60–70 | 6 | 2.2 |
| Activated carbon | 10 | 130–140 | 60–70 | 6 | 17.1 |
| Activated carbon Plus KI | 10<br>0.55 | 130–140 | 60–70 | 6 | 44.0 |
| Activated carbon Plus KI | 50<br>0.11 | 130–140 | 60–70 | 5 | 99.9+ |
| Activated carbon Plus KI | 25<br>0.055 | 130–140 | 60–70 | 6 | 98.5 |
| Activated carbon Plus KI | 16.66<br>0.033 | 130–140 | 60–70 | 6 | 55.4 |
| Activated carbon Plus KI | 16.66<br>0.11 | 130–140 | 60–70 | 6 | 85.5 |

Arsenious acid is not very soluble in water but the amounts of water present in the reaction mixtures is not very critical. I usually start with a suspension of arsenious acid so that the resulting solutions of arsenic acid is as concentrated as can conveniently be obtained and handled.

Other combinations of soluble and insoluble catalysts will show similar relationships in efficiency.

The apparent relatively low efficiency of potassium iodide in the above tests is explained as follows: Potassium iodide is in this reaction decomposed into free iodine which is eliminated with the excess air passed through the reaction mixture. In the case of mixtures of iodides and activated carbon at least part of the free iodine is adsorbed on the latter and remains in the system. By continuously feeding small amounts of potassium iodide into the reaction system one can increase the speed of the reactions and the excess of free iodine can be recovered from the excess air continuously eliminated from the pressure vessel.

The operation can also be carried on continuously by pumping a solution or suspension of arsenious acid into the top of a reaction tower into which steam and compressed air is continuously introduced at the bottom. The tower contains the solid catalyst such as activated carbon, silicic acid gel, a vanadium compound precipitated upon a porous carrier, platinized asbestos, etc. and the arsenious acid solution may contain, if desired, a soluble catalyst.

The solution of arsenic acid obtained in either form of carrying out my process is freed from the soluble catalyst and the arsenic acid recovered from its solutions by well known means, or the solution is used directly in the manufacture of arsenicals or for any other purposes as desired.

The above tabulation is merely given as illustrative of the manner in which the oxidation of arsenious acid with a gas containing free oxygen is carried out in the presence of a catalyst under superatmospheric pressure and at temperatures above 100° C. It will be understood that the conditions of time, temperature and pressure will vary with various catalysts and will in each instance have to be modified according to the activity of the catalyst or catalysts used.

Arsenious acid being difficult to wet with water, I found it of advantage to add to the aqueous medium a substance which reduces the surface tension of water, such agent being conveniently one of the well known wetting out agents used in the textile industry. I can also add to the reaction liquid a foam abating agent such as a sulfonated vegetable oil.

I claim:

1. The process of contacting arsenious acid in aqueous medium with atmospheric air in the presence of a multiple catalyst and under conditions of superatmospheric pressure and at a temperature above 100° C., said multiple catalyst comprising a substance, dissolved in said aqueous medium, being effective to promote the oxidation of arsenious acid, and a substance, insoluble in said aqueous medium, being likewise effective to promote the oxidation of arsenious acid.

2. The process of oxidizing arsenious acid which comprises introducing air under pressure into an aqueous system comprising arsenious acid and iodine and maintaining said system at a temperature above 100° C. and at a pressure greater than atmospheric.

3. The process of oxidizing arsenious acid which comprises introducing air under pressure into an aqueous system comprising arsenious acid and activated carbon and maintaining said system at a temperature above 100° C. and at a pressure greater than atmospheric.

4. The process of oxidizing arsenious acid which comprises introducing air under pressure into an aqueous system comprising arsenious acid, iodine and activated carbon, and maintaining said system at a temperature above 100° C. and at a pressure greater than atmospheric.

5. The process of oxidizing arsenious acid which comprises introducing air under pressure into an aqueous system comprising arsenious acid, a soluble iodide and activated carbon, and maintaining said system at about 130–140° C. and at a pressure of about 60–70 lbs.

ERNEST R. BOLLER.